United States Patent
Farkash et al.

(10) Patent No.: US 12,229,555 B2
(45) Date of Patent: Feb. 18, 2025

(54) GENERATING MASKS FOR FORMATS INCLUDING MASKING RESTRICTIONS

(71) Applicant: International Business Machines Corporation, Armonk, NY (US)

(72) Inventors: Ariel Farkash, Shimshit (IL); Micha Gideon Moffie, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 17/352,350

(22) Filed: Jun. 20, 2021

(65) Prior Publication Data
US 2022/0405099 A1 Dec. 22, 2022

(51) Int. Cl.
*G06F 9/30* (2018.01)
*G06F 11/34* (2006.01)
*G06F 11/36* (2006.01)
*G06F 21/62* (2013.01)
*H04L 9/06* (2006.01)

(52) U.S. Cl.
CPC ...... *G06F 9/30018* (2013.01); *G06F 9/30038* (2023.08); *G06F 11/3409* (2013.01); *G06F 11/3684* (2013.01); *G06F 21/6227* (2013.01); *H04L 9/06* (2013.01); *H04L 2209/04* (2013.01)

(58) Field of Classification Search
CPC ............. G06F 9/30018; G06F 11/3409; G06F 11/3684; G06F 21/6227; G06F 9/30038; H04L 9/06; H04L 2209/04
See application file for complete search history.

(56) References Cited

U.S. PATENT DOCUMENTS

| | | | |
|---|---|---|---|
| 2014/0108813 A1 | 4/2014 | Pauker et al. | |
| 2014/0351943 A1* | 11/2014 | Gianniotis | G06F 21/60 726/26 |
| 2015/0134972 A1 | 5/2015 | Martin et al. | |
| 2015/0358159 A1* | 12/2015 | Rozenberg | H04L 9/0618 380/28 |
| 2016/0380998 A1 | 12/2016 | Davis et al. | |
| 2017/0337225 A1 | 11/2017 | Kumaresan et al. | |
| 2020/0012797 A1* | 1/2020 | Adir | G06F 21/602 |
| 2021/0192072 A1* | 6/2021 | Roake | G06F 21/602 |
| 2021/0248154 A1* | 8/2021 | Wu | G06F 16/24578 |
| 2021/0263900 A1* | 8/2021 | Joyce | G06F 16/2228 |
| 2022/0311596 A1* | 9/2022 | Boesgaard | H04W 12/02 |

OTHER PUBLICATIONS

Gergö Làdi, "Semantics-Preserving Encryption for Computer Networking Related Data Types", 12th International Symposium on Applied Informatics and Related Areas, Nov. 9, 2017, 6 pages, Székesfehérvár, Hungary.

Peter Mell et al., "The NIST Definition of Cloud Computing", National Institute of Standards and Technology, Special Publication 800-145, Sep. 2011, Gaithersburg, MD, 7 Pages.

* cited by examiner

*Primary Examiner* — Kevin Bechtel
*Assistant Examiner* — Forrest L Carey
(74) *Attorney, Agent, or Firm* — Eric W. Chesley (57) ABSTRACT

An example system includes a processor to receive an instance of a composite format comprising a masking restriction. The processor can generate a mask for the instance of the composite format based on the masking restriction. The processor can output the generated mask.

20 Claims, 7 Drawing Sheets

GENERATING MASKS FOR FORMATS INCLUDING MASKING RESTRICTIONS

BACKGROUND

The present techniques relate to masking instances of data. More specifically, the techniques relate to masking instances of formats.

SUMMARY

According to an embodiment described herein, a system can include processor to receive an instance of a composite format comprising a masking restriction. The processor can also further generate a mask for the instance of the composite format based on the masking restriction. The processor can also output the generated mask. The system can thus enable group of instance to only map within the group and not outside the group during a format-preserving masking. Optionally, the composite format comprises a tiled composition format comprising a tiled union of sub-formats to be used as tiles for the masking restriction. In this embodiment, the system can enable ranges of values for the masking restriction to be specified in advance. Optionally, the masking restriction comprises tiles specifying ranges of values statically defined in the composite format. In this embodiment, the system can avoid the processing used to dynamically define ranges of values. Preferably, the masking restriction is to restrict the mask for the instance in the domain of the format to a partial set of values within the domain. In this embodiment, the masking restriction may keep values within the reduced domain while enabling other format properties. Preferably, the masking restriction does not change a set of valid values of a domain of the format. In this embodiment, the domain of the format remains the same and valid values for the format therefore remain the same. Preferably, the masking restriction does not change cipher operation properties. In this embodiment, the system enables cipher operation properties such as reversibility and consistency to remain unaffected by the masking restriction. Optionally, the masking restriction comprises a dynamic masking restriction comprising a rule used to dynamically define ranges of values based on a value of the instance of the composite format. In this embodiment, large ranges of values may not have to be specified in advance. Optionally, the format further comprises a format restriction that restricts a domain of the format. In this embodiment, format restrictions such as checksums may be supported.

According to another embodiment described herein, a method can include receiving, via a processor, an instance of a composite format comprising a masking restriction. The method can further include generating, via the processor, a mask for the instance of the composite format based on the masking restriction. The method can also further include outputting, via the processor, the generated mask. The method can thus enable group of instance to only map within the group and not outside the group during a format-preserving masking. Optionally, generating the mask may include ranking the instance based on a tile specified in the masking restriction and masking the ranking to a second instance of the composite format within the tile. In this embodiment, the method enables the value of the mask to remain within a same tile as the original instance. Optionally, generating the mask may include dynamically generating tiles based on the masking restriction and the instance, where the generated mask comprises a value within a dynamically generated tile that includes the instance. In this embodiment, large value ranges or sets of tiles may not have to be specified in advance. Optionally, generating the mask may include generating a new format based on the instance in response to detecting that the masking restriction comprises an immutable dynamic masking restriction, and generating the mask for the instance based on the new format. In this embodiment, resources may be saved by not having to specify particular ranges of values for the masked in advance. Optionally, generating the mask comprises dynamically dividing an entire domain of the composite format into a plurality of sub-domains and dynamically restricting the mask of the instance to a value within a sub-domain of the plurality of sub-domains corresponding to the instance. In this embodiment, a format-preserving operation may be masked according to a particular instance. Optionally, the method includes receiving data, searching the data to detect the instance of the composite format, matching the instance with the composite format, and masking in place the matched instance with the generated mask to generate masked data. In this embodiment, the method enables a composite format-preserving operation with masking restrictions. Optionally, the method includes outputting the masked data to an application to be used as test data for validation of the application. In this embodiment, the method enables an efficient generation of test data for validation of the application.

According to another embodiment described herein, a computer program product for masking instances of formats can include computer-readable storage medium having program code embodied therewith. The computer readable storage medium is not a transitory signal per se. The program code executable by a processor to cause the processor to receive an instance of a composite format comprising a masking restriction. The program code can also cause the processor to generate a mask for the instance of the composite format based on the masking restriction. The program code can also cause the processor to output the generated mask. The program code can thus enable group of instance to only map within the group and not outside the group during a format-preserving masking. Optionally, the program code can cause the processor to rank the instance based on a tile specified in the masking restriction and mask the ranking to a second instance of the composite format within the tile. In this embodiment, the program code enables ranges of values to be specified for the masking restriction in advance. Optionally, the program code can cause the processor to dynamically generate tiles based on the masking restriction and the instance, where the generated mask comprises a value within a dynamically generated tile that includes the instance. In this embodiment, the program code enables the masking restriction to use dynamically generated ranges of values based on the instance. Optionally, the program code can cause the processor to generate a new format based on the instance in response to detecting that the masking restriction comprises an immutable dynamic masking restriction, and generate the mask for the instance based on the new format. In this embodiment, the program code can avoid the use of many ranges in advance by use of an immutable dynamic masking restriction. Optionally, the program code can cause the processor to dynamically divide an entire domain of the composite format into a plurality of sub-domains and dynamically restrict the mask of the instance to a value within a sub-domain of the plurality of sub-domains corresponding to the instance. In this embodiment, the program code enables a dynamic masking restriction based on the value of the instance.

DETAILED DESCRIPTION

A framework may be capable of defining formats. A format, as used herein, is a data unit that can match, search, and rank itself. For example, a match may be given a string return a Boolean yes if string is a legal string in the format. A match may also include validation of any additional format restrictions. As used herein, a format restriction refers to any restriction that reduces the domain of possible valid values of instance for a format. For example, a format restriction may be a checksum performed and validated against one of the digits of the format. Given a text, a search may search for occurrences of matches. In a rank, a given string of the format will produce a unique and consistent integer bound by the size of the domain. In various examples, the process may be reversible, thus, the original string can also be reproduced from a given integer. In some examples, the formats may be composable into composite formats. A composite format, as used herein, is defined as a hierarchical composition of sub-formats in a recursive manner. Each sub-format is a format, and an instance of a composite format or a building block format. For example, a composite format may be a concatenation or a union of sub-formats.

In some cases, instances of formats may be masked using any suitable techniques, such as encryption or tokenization. For example, the encryption may be a format-preserving encryption (FPE) and the tokenization may be a format-preserving tokenization (FPT). Typically, when performing FPE, the input may an instance from the domain, and the instance may be mapped and transformed to any other instance in the given domain. For example, if the domain is the integer range 100-200, then an example for a valid input is 117, and after FPE the input may transform to 185, 128, or any other legal value in the domain. The instances may be masked in place to generate masked data and the masked data sent to a downstream application for any suitable use. For example, the downstream application may be a validation application and the masked data may be used as test data. However, sometimes the transformation is to be constrained in some fashion. For example, a validation application may include one or more validation checks that check whether a value of an input data type falls within a band of values. Therefore, masked values falling outside the range of the band may fail to be properly validated as a particular data object by the validation application. As one example, such a problem may exist when masking Internet Protocol (IP) addresses. IP addresses may be either IPv4 or IPv6. When processing and masking a payload, a typical request may be to maintain the original sub-format. For example, the request may be to mask an IPv4 address to another IPv4 address because the downstream applications may be expecting this, and able to process, an IPv4 address, but not yet an IPv6 address. In another example, a phone number 555-123-8888 may be sought to be masked, where the area code, 555 in the example, is to be maintained. A typical FPE may result in any valid phone number. For example, the FPE may result in the number 123-456-0987 without the use of any additional restrictions.

According to embodiments of the present disclosure, a system includes a processor to receive an instance of a composite format including a masking restriction. The processor can generate a mask for the instance of the composite format based on the masking restriction. The processor can output the generated mask. Thus, embodiments of the present disclosure allow a group of instance to only map within the group and not outside the group during a format-preserving masking. Therefore, the embodiments prevent an instance from being transformed into a mask that has a value that lies outside of the instance group or tile containing the instance. Moreover, the various masking restrictions described herein can be applied at any level of a composite format. For example, a masking restriction can be applied to the entire format, a concrete format, or a sub-format at any level of the hierarchy in a composite format. Because masking restrictions are not a format restrictions, masking restrictions also do not affect the set of valid values or the domain of a composite format. The embodiments described herein thus enable masking restrictions such as tiled composition restrictions within a given domain without limiting the format or data class. In other words, all legal values of the original format may remain, and without losing characteristics of masking, such as reversibility.

Figure 1:
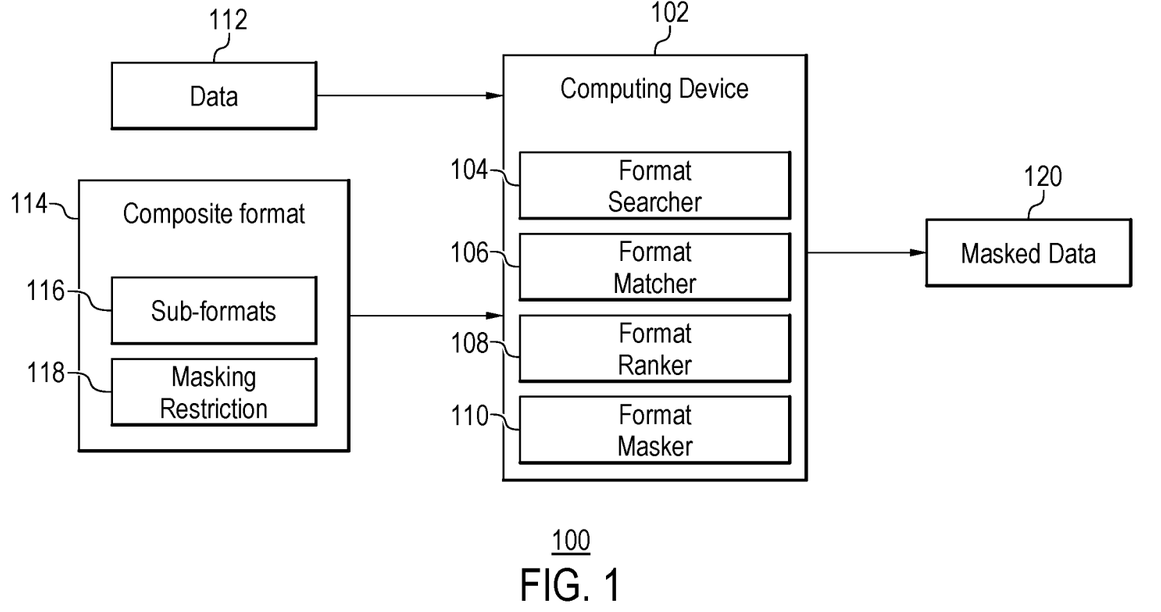
FIG. 1 is a block diagram of an example system for masking formats with masking restrictions.

With reference now to FIG. 1, a block diagram shows an example system for masking formats with masking restrictions. The example system 100 of FIG. 1 includes a computing device 102. As one example, the computing device 102 may be a cloud-based service that provides masking services for formats. The computing device 102 includes a format searcher 104, format matcher 106, a format ranker 108, and a format masker 110. The system 100 also includes data 112 and composite format 114 shown being received at the computing device 102. For example, the data 112 and composite format 114 may be received from another computing device (not shown). The composite format 114 includes sub-formats 116. For example, the composite format 114 may be a concatenation or union of sub-formats 116. The composite format 114 also includes a masking restriction 118. In various examples, the masking restriction 118 may be a static masking restriction or a dynamic masking restriction. A static masking restriction, as used herein, refers to a masking restriction in which a range of values for the masking restriction is explicitly defined in the static definition of the format. For example, a static masking restriction 118 may be a tiled composition that serves as a union of a list of sub-formats 116 as tiles. Each of the sub-formats may have a statically defined range of values. As used herein, a dynamic masking restriction refers to a masking restriction in which a rule is provided by which such range of values can be dynamically set. For example, the range of values may be dynamically set based on the value of a given instance. Thus, in dynamic masking restrictions, a range of values for the masking restriction is not explicitly mapped out in the static definition of the format. For example, the range of values may not be specified in advance in the format definition because the range of possible values may be too large. In various examples, a dynamic masking restriction may be an immutable restriction. For example, the immutable restriction may be used to hold a portion of a composite format constant. The masked value of the immutable portion may thus depend on and stay the same as the value in the original instance. In some examples, a dynamic masking restriction may be a bucket perturbation type of dynamic masking restriction. For example, a rule may be provided that values after masking are to appear within a same dynamic buckets as the input value for a given portion of a composite format. In some examples, the rule may include parameters for generating the dynamic buckets. The computing device 102 is also shown outputting masked data 120. For example, the masked data 120 may have one or more instances of the composite format 114 masked according to the masking restriction 118. In various examples, the masked instances of composite form 114 in masked data 120 may be portions of data that are encrypted or tokenized.

As shown in FIG. 1, the computing device 102 may be provided with data 112 and composite format 114 with masking restriction 118 and output masked data 120, in which any occurrences of the composite format 114 in the data 112 is masked. For example, the data 112 may include text corresponding to a composite format 114 to be searched and masked. In various examples, the sub-formats that the composite format 114 is built from include the masking restriction 118 and any combination of building blocks or composite formats composed of additional sub-formats (not shown). As used herein, a building block refers to a format building block that is combinable with one or more other sub-formats via compositions to form a composite format 114. In various examples, a building block may be in the form of an Integer[Min,Max], FixedLengthPaddedInteger [Min, Max, Length], RealNumber[Min, Max, Precision], FixedLengthString[Alphabet, Length], VariableLengthString[Alphabet, MinLen, MaxLen], a finite RegularExpression, or a StringSet format. A set of example building block types with respective example values are shown in the table below:

TABLE 1

Build Block Format Types and Example Instances

| Building Block Types | Example Instances |
| --- | --- |
| Integer[Min, Max] | 134 |
| FixedLengthPaddedInteger[Min, Max, Length] | 0012 |
| RealNumber[Min, Max, Precision] | 23.45 |
| FixedLengthString[Alphabet, Length] | ABCDE, abcde |
| VariableLengthString[Alphabet, MinLen, MaxLen] | ABC, ABCD, abcde |
| Finite RegularExpression | \d{2,5}\.[A-Z]{3} |
| StringSet | [David, Jason, Michael] |

In various examples, the composite format 114 may be any suitable combination of sub-formats that can search, match, and rank themselves. For example, the combination of sub-formats may be a concatenation of sub-formats 116. A concatenation, as used herein, is a series of formats linked together. For example, the composite format CUST001 is an instance of a concatenation type composite format that includes two sub-formats: a CUST fixed string and an Integer range [1-700]. In some examples, the combination of sub-formats may be a concatenation or a union of sub-formats 116. A union, as used herein, is a combination of interchangeable sub-formats. For example, the integer ranges format of [1-200, 300-500, 700-950] is an example union of three integer ranges that can be used interchangeably. In various examples, to enable each of the building blocks to search, match, and rank themselves, a textual pattern facet of each building block that is not a finite regular expression type sub-format may be implemented as an automatically generated regular expression. A generated regular expression, as used herein, is a sequence of characters that specifies a search pattern. As one example, the textual pattern facet of [0-27] may be represented using the regular expression: (?:1?[0-9])|2[0-7]). In addition, the composite format 114 can also search, match, and rank itself. In order to enable the composite format 114 to search, match, and rank itself, the composite textual patterns of the composite format 114 are implemented as a regular expression automatically generated based on sub-formats and composition type. For example, the composite textual pattern may be a regular expression representing a hierarchical structure of sub-formats represented as regular expressions. For example, the composite textual pattern [0-27, 80-89] may be represented using the regular expression: (?:1?[0-9])|2[0-7]) |(?:8[0-9]). In this manner, the composite formats 114 may be able to map each part of an input string from data 112 to its corresponding sub-format for computing a composite ranking and unranking based on their sub-formats, as well as performing any additional validations. For example, the composite format 114 may be able to map a value of 26 to the first range or the value 82 to the second range of the composite textual pattern [0-27, 80-89]. Because validations may be performed at any level of the hierarchy, any such validation may rely on the mapping of the value in order to determine whether the value is to be validated. In addition, the mapping may be used to perform nested validations in which a sub-format is validated before a composite format is also validated. In various examples, for tiled composition formats, a union composition may be relied on for both match and search as described below.

In various examples, the composite format searcher 104 can search for occurrences of the composite format 114 in the data 112. For example, given a text from the data 112, the composite format searcher 104 can detect candidate matches of the composite format 114 in the text. The candidate matches may be strings of text in the data 112 that match the composite textual pattern of the composite format 114. The composite textual pattern of the composite format 114 may include the textual pattern of the finite regular expression sub-format 116. In various examples, for tiled compositions, the composite format searcher 104 can create a search by unifying the search of the sub-formats of the tiled composition format. For example, the composite format searcher 104 can use a regular expression with or for searching tiled composition formats. The composite format searcher 104 can then call a match( ) method on each of the detected occurrences of candidate matches. For example, the match( ) method may be executed by the composite format matcher 106.

In various examples, given a string in data 112, the composite format matcher 106 can match occurrences with the composite format 114. For example, the composite format match 106 can return a Boolean yes if the string is a legal string in the composite format 114. For example, the given string may be a detected occurrence of a candidate match with the composite format 114 from the composite format searcher 104. In some examples, a regular expression generator (not shown) may first generate a regular expression that is the text pattern for the composition at hand. In various examples, in the case of tiled composition formats, the match is delegated to the sub-format that corresponds to the tile the input string value belongs to. In some examples, the regular expression of each sub-format may also be recursively generated. In some examples, to map each sub-format to its respective text, sub-formats may be kept in capturing groups when generating regular expressions corresponding to composite format 114. For example, parentheses may be used to group regular expressions between the parentheses. The parentheses may thus be used to capture the text matched by the regular expression inside them into a numbered group that can be reused with a numbered backreference. The numbered backreferences may be used to map the regular expressions of each grouped sub-format to the respective text.

In various examples, the composite format matcher 106 can then run a regular expression match on given string against the regular expressions generated for the composite format 114, and return false if it does not match. In various examples, the composite format matcher 106 can decompose the given string to its sub-format matching using capturing groups and call a match on each sub-format with the respective sub-string. If any of the matching of the sub-formats fails, then the composite format matcher 106 may return a value of false. Otherwise, the composite format matcher 106 may return a value of true indicating that the given string matches the composite format 114, as well as any additional validations that may have been performed. In this manner, the composite format matcher 106 can validate both sub-formats as well as the format composition of the detected occurrences of a composite format 114.

The format ranker 108 can rank instances of tiled compositions. For example, for an instance of a given format 114 with a particular tiled masking restriction 118 the format ranker 108 can determine a tile that the instance belongs to and delegate the ranking to the sub-format 116 that corresponds to the tile. In various examples, an effective domain of the ranking may thus be the size of the tile that each particular instance belongs to.

Still referring to FIG. 1, given one or more validated legal strings of the composite format 114, the format masker 110 can mask such validated occurrences of composite formats 114 in the data 112 to generate masked data 120. In various examples, the format masker 110 can use a composite rank-then-cipher in order to mask the validated occurrences of composite format 114. For example, a composite rank-then-cipher may include ranking strings of the data 112 into integers and performing an integer format-preserving encryption (FPE). In a composite rank-then-cipher, strings may be encrypted in three steps, referred to herein as ranking, integer-format-preserving-encryption, and unranking. In various examples, for the ranking of a string s, an index i such that $s=s_i$ may be found. For example, the format masker 110 can first produce a unique and consistent integer bound by the size of the domain of the composite format 112. For example, if 100 possible values exist for a given composite format 114, then the format masker 110 can generate a unique integer value for the specific string formatted in the composite format 114 from 1-100.

In various examples, the format masker 110 can thus use the hierarchical structure of the composite format in order to parse the composite format 114 and determine a ranking for each sub-format and a relative ranking of the sub-formats to rank all possible combinations of the composite format 114. In some examples, for a tiled composition masking restriction 118, the format masker 110 can receive a relative ranking of an instance of the tiled composition from the sub-format 116 corresponding to the tile of the instance.

Then, in some examples, the format masker 110 can execute an integer-encryption by encrypting index i into an index j, using an integer-FPE algorithm. In some examples, the cipher may be an encryption that is provided an integer i from the domain d [0,d.size), and returns an integer j in [0,d.size), that is only reversible using the encryption key. In various examples, the cipher operation may be a tokenization. For example, in a tokenization, the operation used to encrypt the integer may be a secure hash function, such as SHA-3. Thus, the given an integer i from the domain d [0,d.size), the tokenization may return an integer j in [0,d.size), that is consistent but not reversible. In various examples, for tiled composition masking restrictions 118, the format masker 110 can dynamically limit the cipher rank to the tile size of the tile identified as belonging to the instance to be masked. For example, if the instance belongs to a tile with a size of 32 instances, then the effective domain for the ranking may have a size of 32 and the value of the encrypted integer may be limited to the effective domain. In various examples, each tile may have a different size. Therefore, as another example, a second instance that falls into a different tile may have an effective domain of 52 for the ranking.

In various examples, the format masker 110 can perform an unranking to generate the encryption of s, which is the string $s_j$. In various examples, decryption may be performed in the same manner by replacing the integer-FPE encryption with the decryption algorithm. In some examples, the building blocks Integer[Min,Max], FixedLengthPaddedInteger [Min, Max, Length], and RealNumber[Min, Max, Precision], may be ranked using an integer domain ranking algorithm. The building blocks FixedLengthString[Alphabet, Length] and VariableLengthString[Alphabet, MinLen, MaxLen] may be ranked using a lexicographic ranking algorithm. The building block RegularExpression may be ranked using a state machine. The building block StringSet may be ranked using an enumeration ranking algorithm. In various examples, when the cipher operation is reversible, such as in encryption, the rank-and-cipher process is also reversible. Thus, given an integer of a particular composite format 114, a composite format unmasker (not shown) may reproduce the original string from data 112 that was masked in masked data 118.

In one example, a column in a database may represent values for a parameter in a particular composite format 114. For example, the composite format 114 may include a masking restriction 118 represented by a tiled composition format of tiles representing integer ranges, as shown in the sample format definition below:

```
"formats": [
  {
    "id": "Workload_Size"
    "format": {
      "type": "Tiled",
      "configuration: {
        "subformats": [
          {
            "type": "Integer",
            "configuration": {
              "min": 10,
              "max": 20
```

```
            }
        },
        {
            "type": "Integer",
            "configuration": {
                "min": 21,
                "max": 30
            }
        },
        {
            "type": "Integer",
            "configuration": {
                "min": 31,
                "max": 35
            }
        },
        {
            "type": "Integer",
            "configuration": {
                "min": 36,
                "max": 40
            }
        },
    ]
```

In addition, the same table may have a column representing a band of a second parameter, such as employees. For example, an organization may have a policy that each band of the employees is mapped to a non-overlapping set of ranges for the workload size in the first column. In various examples, the embodiments described herein may be used to mask the values of the class size column without changing the band range of the original values with which the class size values are associated. For example, an employee in the band associated with 10-20 will always receive a value in that band range, and an employee in the band associated with the range 36-40 will similarly always receive a value in that range. A masking specification for creating test data for this table and column in an application may therefore be that the values of each column remain within the same original range of the ranges specified in the format. Thus, a masking restriction 118 for the values in this particular example may be that the masked values remain in their original tiles, or band ranges. For example, the tiles may be 10-20, 21-30, and so forth. In various examples, the format ranker 110 may therefore rank a particular instance based on its particular tile. Because each of the sub-formats 116 are formats and thus able to rank themselves, the ranking may therefore be delegated to a sub-format 116 that corresponds to the tile in which the current instance belongs. Then, the format masker 110 can apply a transformation on the rank such that the resulting mask also contains a value from the sub-format corresponding to the same tile as the ranked instance. The rank transformation would therefore be dynamically limited to its allowed range based on the tile size in the masking restriction. For example, the effective size of the domain used for the transformation may be a size of the tile in which the instance belongs in this case, and thus the output value would always fall within the corresponding range. Another specific example may be in a database used for identification cards, as shown in the format definition below:

```
"format": {
    "type": "Concatenation",
    "configuration: {
        "subformats": [
            {
                "type": "RegularExpression",
```

```
                "configuration": {
                    "regex": "(?:[A-Z]\\d{4} \\d{5} )|(?:[A-Z]\\d{9})"
                }
            },
            {
                "type": "Tiled",
                "configuration": {
                    "subformats" : [
                        {
                            "type": "FixedLengthPaddedInteger",
                            "configuration
                                "min": "1",
                                "max": "12"
                            }
                        },
                        {
                            "type": "FixedLengthPaddedInteger",
                            "configuration
                                "min": "51",
                                "max": "62"
                            }
                        }
                    ]
                }
            },
            {
                "type": "RegularExpression",
                "configuration": {
                    "regex": \\d{3}
                }
            }
        }
    }
}
```

For example, valid values in this above concatenated type composite format may be: "G4122 26005 58796", "D2693 58993 51375", "J58327930708932". The specification in this example may be to mask the values of the tiled subformats, but not change the tile of the values being masked. The resulting masked values may therefore be within the format, while also remaining within the original tile in which the masked instance was found. For example, an identification card that has the tiled value of 1 may be masked to a value lying within the range 1-12, which are valid values for a first civilian status encoded into the identification, and an identification card that has a tiled value of 51 may be masked to any value in the range 51-62, which are valid values for a second civilian status encoded into the identification. In this manner, the values in the middle of the concatenated type composite format may maintain their semantics after being masked using any suitable technique, such as FPE or FPT.

In another example, a dynamic masking restriction may be used to restrict masking of a simple phone format:

```
"format": {
    "type": "Concatenation",
    "configuration: {
        "subformats": [
            {
                "type": "Immutable",
                "configuration": {
                    "subformat" : {
                        "type": "RegularExpression",
                        "configuration
                            "regex": "\\d{3}"
                        }
                    }
                }
            },
            {
                "type": "RegularExpression",
```

-continued

```
        "configuration": {
            "regex": "-\\d{3}-\\d{4}"
        }
      }
    ]
  }
}
```

In this example, the format pattern for the telephone number may appear in the form: ###-###-####. The masking restriction of type "Immutable" is applied to the first three characters defined using a regular expression and corresponding to an area code, which should not change during any transformation, such as FPE or FPT. In various examples, during masking, the format masker 110 can generate a new format with a static first three characters based on the received instance. The format masker 110 can then use the new format for masking the particular received instance.

As another example of a dynamic masking restriction, a masking specification for a global positioning satellite (GPS) coordinate may be for the masked coordinate not to stray too far from the original location, but maintain all other aspects of the masking transformation such as reversibility in the case of FPE. In this example, a bucket perturbation type masking restriction may be used for the dynamic masking restriction. For example, the rule may be provided that values after masking are to appear within a same dynamic buckets at the input value for a given portion of a composite format. The rule may also include various parameters, such as the size of the sub-domains, the number of tiles to be generated, etc. In various examples, the format masker 110 can dynamically divide the entire domain into sub-domains. For example, the format masker 110 can divide an area of a map containing possible GPS coordinates into squares. The format masker 110 can then determine which of the squares contain the received instance of a GPS coordinate and mask the instance of the GPS coordinate with another coordinate inside the same square.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional computing devices, or additional formats, masking restrictions, etc.).

Figure 2:
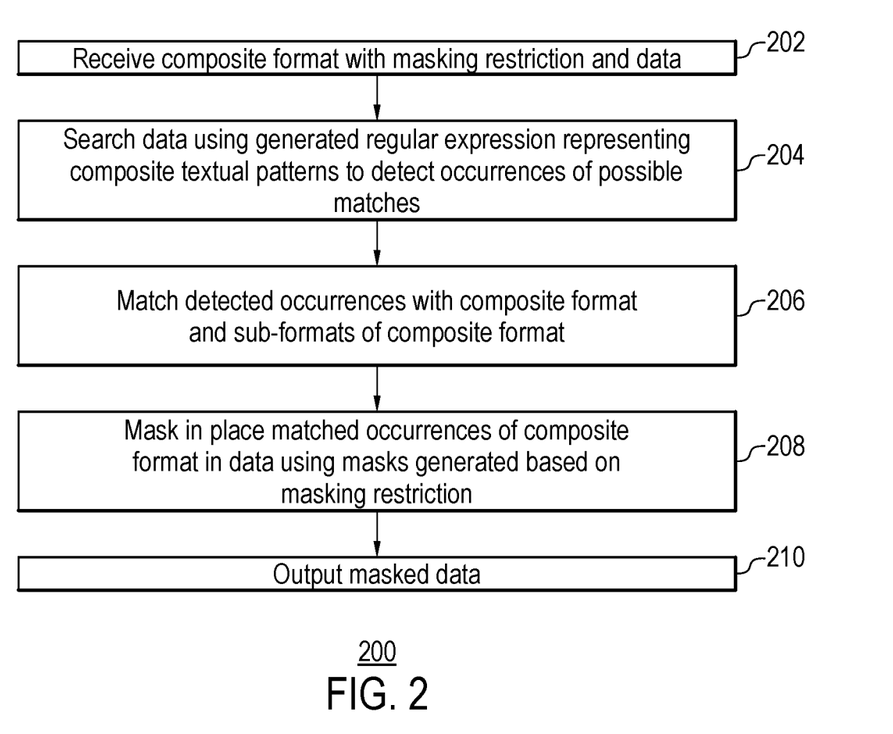
FIG. 2 is a block diagram of an example method that can search, match, and mask formats with masking restrictions.

FIG. 2 is a process flow diagram of an example method that can search, match, and mask formats with masking restrictions. The method 200 can be implemented with any suitable computing device, such as the computing device 400 of FIG. 4 and is described with reference to the system 100 of FIG. 1. For example, the method described below can be implemented by the processor 402 or the processor 702 of FIGS. 4 and 7.

At block 202, a processor receives a composite format with a masking restriction and data. For example, the masking restriction may be a static masking restriction or a dynamic masking restriction.

At block 204, the processor searches the data using regular expressions representing composite textual patterns to detect occurrences of possible matches. For example, the occurrences of possible matches may include strings that do not conform to particular format restrictions.

At block 206, the processor matches detected occurrences with the composite format and sub-formats of the composite format. In some examples, the processor also validates any format restrictions. For example, the format restrictions may include checksums or any other suitable format restriction.

At block 208, the processor masks in place matched occurrences of the composite format in the data using masks generated based on the masking restrictions. For example, validated instances of the composite format may be replaced with the format-preserving mask in the data. In various examples, the mask may be generated using the method 300 of FIG. 3.

At block 210, the processor outputs the masked data. For example, the masked data may be output to an application for any suitable purpose. For example, the processor can output the masked data to an application to be used as test data for validation of the application.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
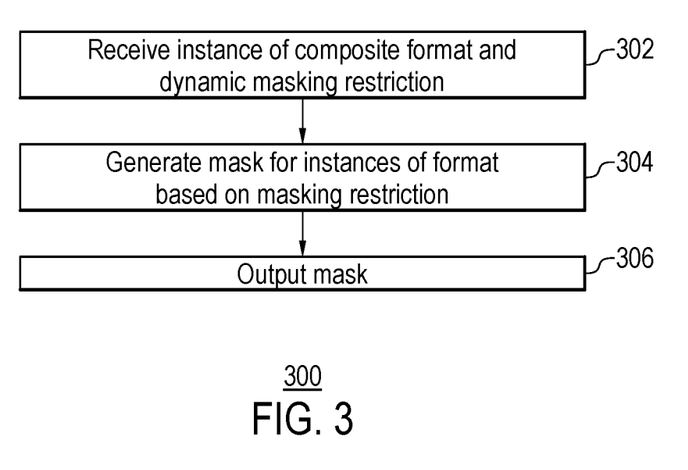
FIG. 3 is a block diagram of an example method that can generate masks for instances of formats according to masking restrictions.

FIG. 3 is a process flow diagram of an example method that can generate masks for instances of formats according to masking restrictions. The method 300 can be implemented with any suitable computing device, such as the computing device 400 of FIG. 4 and is described with reference to the system 100 of FIG. 1. For example, the method described below can be implemented by the processor 402 or the processor 702 of FIGS. 4 and 7.

At block 302, a processor receives instances of a composite format including a masking restriction. For example, the masking restriction may be a static masking restriction or a dynamic masking restriction.

At block 304, the processor generates masks for the instances of the composite format based on the masking restriction. For example, the processor can rank the instance based on a tile specified in the masking restriction and masking the ranking to a second instance of the composite format within the tile. In some examples, the processor can dynamically generate tiles based on the masking restriction and the instance, where the generated mask includes a value within a dynamically generated tile that includes the instance. In some examples, generating a new format based on the instance in response to detecting that the masking restriction includes an immutable dynamic masking restriction, and generating the mask for the instance based on the new format. In various examples, the processor can dynamically divide an entire domain of the composite format into a number of sub-domains and dynamically restricting the mask of the instance to a value within a sub-domain of the number of sub-domains corresponding to the instance.

At block 306, the processor outputs the generated mask. For example, the generated mask may be output to a masker for masking a detected and matched instance of the composite format in place.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
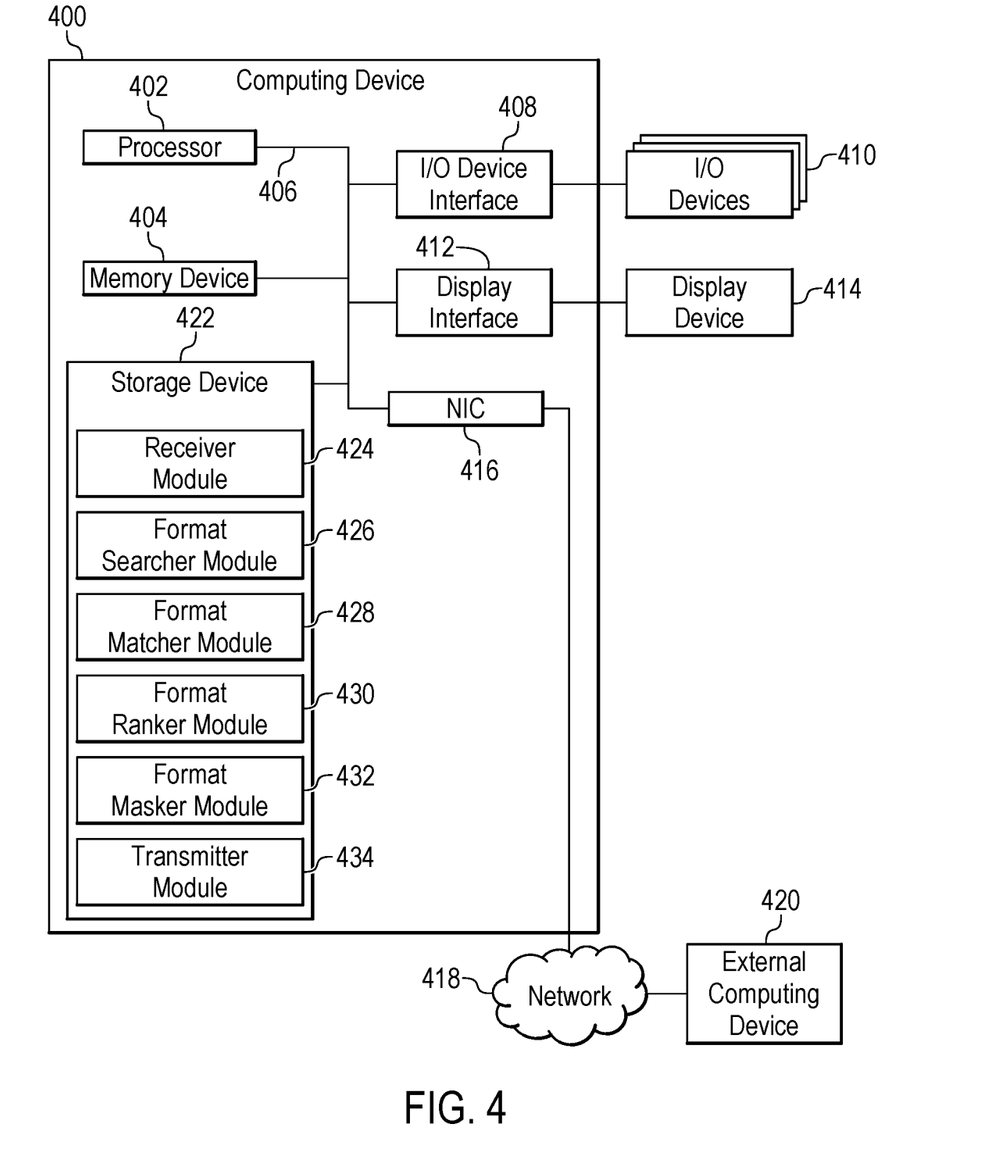
FIG. 4 is a block diagram of an example computing device that can search, match, and mask formats with masking restrictions.

FIG. 4 is block diagram of an example computing device that can search, match, and mask formats with masking restrictions. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external web-server 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a receiver module 424, a format searcher module 426, a format matcher module 428, a format ranker module 430, a format masker module 432, and a transmitter module 430. The receiver module 424 can receive data and a composite format that includes a masking restriction. In various example, the masking restriction restricts the mask for the instance in the domain of the format to a partial set of values within the domain. The masking restriction does not change a set of valid values of a domain of the format. The masking restriction does not change cipher operation properties. For example, a reversibility property of a cipher operation may be unaffected by the masking restriction. In addition, a consistency property of the cipher operation may be unaffected. For example, the input to output transformation of a cipher operation may be consistent. In some examples, the format may also include a format restriction that restricts a domain of the format. For example, the format restriction may be a checksum that limits the number of valid values in the domain of the format. The format searcher module 426 can search the data to detect an instance of the composite format. The format matcher module 428 can match the instance with the composite format. The format ranker module 430 can receive an instance of a composite format including a masking restriction. In various examples, the masking restriction may be a static masking restriction. For example, the masking restriction includes tiles specifying ranges of values statically defined in the composite format. The composite format may include a tiled composition format including a tiled union of sub-formats to be used as tiles for the masking restriction. In some examples, the composite format includes a nested tiled composition format. In some examples, the masking restriction may be a dynamic masking restriction including a rule used to dynamically define ranges of values based on a value of the instance of the composite format. In some examples, the masking restriction includes a dynamic masking restriction. For example, the dynamic masking restriction may include a rule used to dynamically define ranges of values based on a value of the instance of the composite format. In some examples, the dynamic masking restriction may include an immutable restriction. The format ranker module 430 can generate a mask for the instance of the composite format based on the masking restriction. In various examples, the processor can dynamically determine a tile within a tiled composition format of the composite format that the instance of the composite format is associated with and rank the instance within the determined tile. The format ranker module 430 can output the generated mask. The format masker module 432 can mask in place the matched instance with the generated mask to generate masked data. The transmitter module 434 can output the masked data.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the receiver module 424, the format searcher module 426, the format matcher module 428, the format ranker module 430, the format masker module 432, and the transmitter module 430, may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the receiver module 424, the format searcher module 426, the format matcher module 428, the format ranker module 430, the format masker module 432, and the transmitter module 430 can be implemented with logic, wherein the logic, as referred to herein, can include any suitable hardware (e.g., a processor, among others), software (e.g., an application, among others), firmware, or any suitable combination of hardware, software, and firmware.

Figure 5:
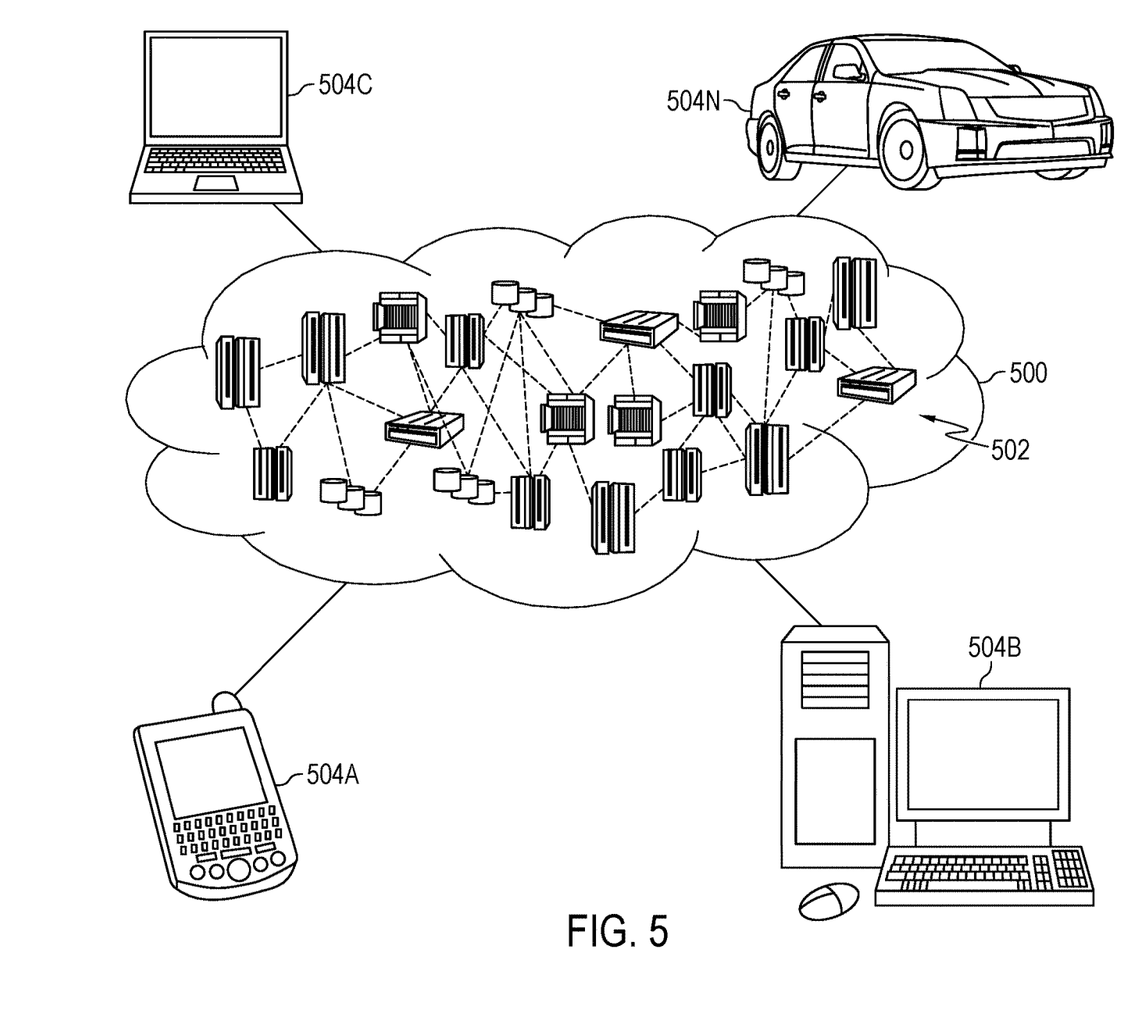
FIG. 5 is a diagram of an example cloud computing environment according to embodiments described herein.

Referring now to FIG. 5, illustrative cloud computing environment 500 is depicted. As shown, cloud computing environment 500 includes one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
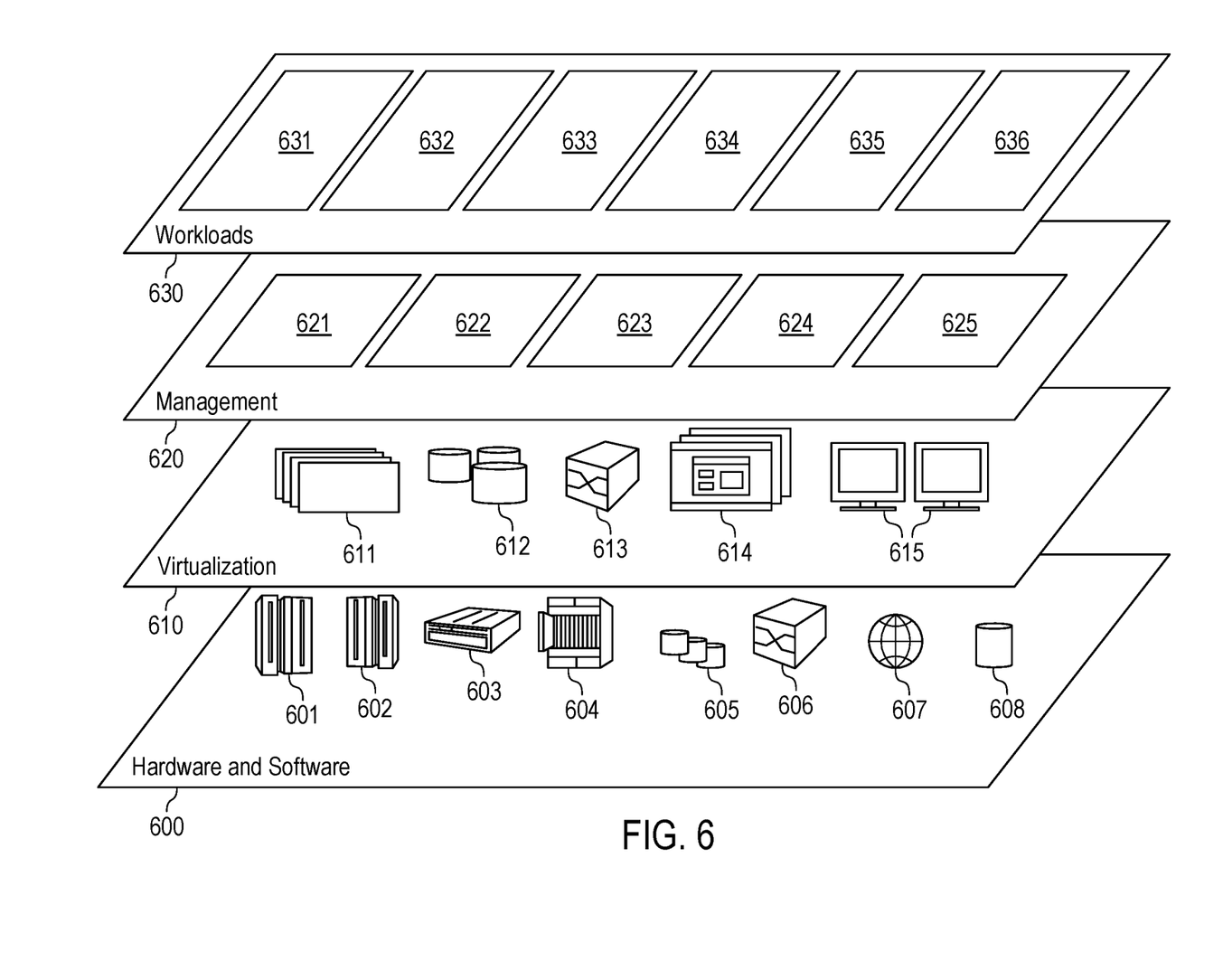
FIG. 6 is a diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include: mainframes 601; RISC (Reduced Instruction Set Computer) architecture based servers 602; servers 603; blade servers 604; storage devices 605; and networks and networking components 606. In some embodiments, software components include network application server software 607 and database software 608.

Virtualization layer 610 provides an abstraction layer from which the following examples of virtual entities may be provided: virtual servers 611; virtual storage 612; virtual networks 613, including virtual private networks; virtual applications and operating systems 614; and virtual clients 615.

In one example, management layer 620 may provide the functions described below. Resource provisioning 621 provides dynamic procurement of computing resources and other resources that are utilized to perform tasks within the cloud computing environment. Metering and Pricing 622 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 623 provides access to the cloud computing environment for consumers and system administrators. Service level management 624 provides cloud computing resource allocation and management such that required service levels are met. Service Level Agreement (SLA) planning and fulfillment 625 provide pre-arrangement for, and procurement of, cloud computing resources for which a future requirement is anticipated in accordance with an SLA.

Workloads layer 630 provides examples of functionality for which the cloud computing environment may be utilized. Examples of workloads and functions which may be provided from this layer include: mapping and navigation 631; software development and lifecycle management 632; virtual classroom education delivery 633; data analytics processing 634; transaction processing 635; and format instance masking 636.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
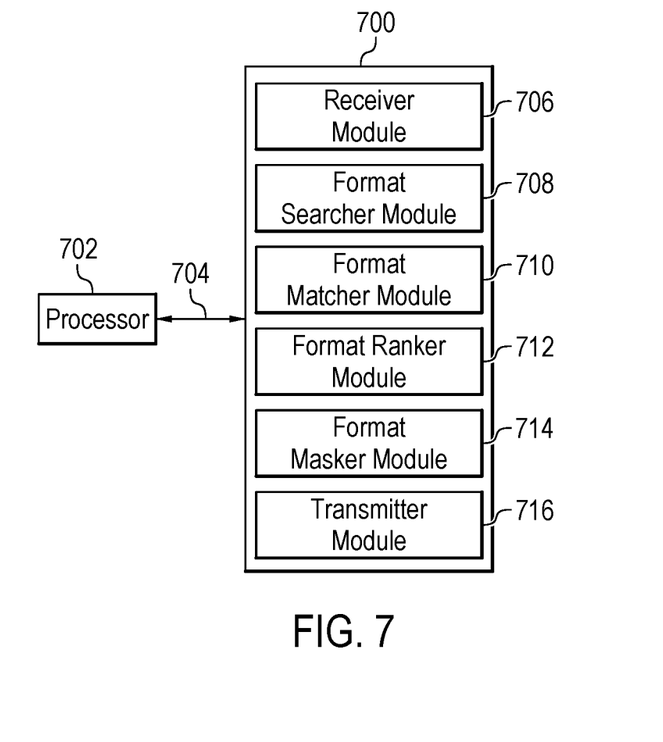
FIG. 7 is an example tangible, non-transitory computer-readable medium that can mask instances of formats according to masking restrictions.

Referring now to FIG. 7, a block diagram is depicted of an example tangible, non-transitory computer-readable medium 700 that can mask instances of formats according to masking restrictions. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the methods 200 and 300 of FIGS. 2 and 3.

The various software components discussed herein may be stored on the tangible, non-transitory, computer-readable medium 700, as indicated in FIG. 7. For example, a receiver module 706 includes code to receive a composite format including a masking restriction and data. For example, the masking restriction may be a static masking restriction or a dynamic masking restriction. A format searcher module 708 includes code to search the data to detect the instance of the composite format. For example, the format searcher module 708 includes code to search the data using regular expressions representing composite textual patterns to detect occurrences of possible matches. A format matcher module 710 includes code to match the instance with the composite format. For example, the format matcher module 710 includes code to matches detected occurrences with the composite format and sub-formats of the composite format. A format ranker module 712 includes code to receive an instance of a composite format including a masking restriction. The format ranker module 712 includes code to generate a mask for the instance of the composite format based on the masking restriction. For example, the format ranker module 712 includes code to rank the instance based on a tile specified in the masking restriction and mask the ranking to a second instance of the composite format within the tile. In some examples, the format ranker module 712 includes code to dynamically generate tiles based on the masking restriction and the instance, wherein the generated mask includes a value within a dynamically generated tile that includes the instance. In various examples, the format ranker module 712 includes code to generate a new format based on the instance in response to detecting that the masking restriction includes an immutable dynamic masking restriction, and generate the mask for the instance based on the new format. In some examples, the format ranker module 712 includes code to dynamically divide an entire domain of the composite format into a number of sub-domains and dynamically restrict the mask of the instance to a value within a sub-domain of the number of sub-domains corresponding to the instance. The format ranker module 712 includes code to output the generated mask. The format masker module 714 includes code to mask in place the matched instance with the generated mask to generate masked data. The transmitter module 716 includes code to output the masked data. For example, the transmitter module 716 may include code to output the masked data to an application to be used as test data for validation of the application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a hardware processor configured to:
    generate a composite regular expression representing a composite textual pattern of a composite format, where the composite format is a hierarchical composition of sub-formats in a recursive manner, and each sub-format is a format that comprises a data unit that can match, search, and rank itself, and the sub-formats are represented as regular expressions;
    search received data using the composite regular expression for an instance of the composite format;
    wherein the instance of the composite format is validated by performing nested validations in which the sub-formats of the composite format are validated before the composite format is validated, and
    wherein a masking restriction is included with the received data, the masking restriction comprising a range of possible values for a mask and an immutable restriction to hold a sub-format of the composite format defined using a regular expression to an original value;
    generate the mask for the instance of the composite format based on the masking restriction; and
    output the generated mask.

2. The system of claim 1, wherein the composite format comprises a tiled composition format comprising a tiled union of sub-formats to be used as tiles for the masking restriction.

3. The system of claim 1, wherein the masking restriction comprises tiles specifying ranges of values statically defined in the composite format.

4. The system of claim 1, wherein the masking restriction is to restrict the mask for the instance in a domain of the composite format to a partial set of values within the domain.

5. The system of claim 1, wherein the masking restriction does not change a set of valid values of a domain of the composite format.

6. The system of claim 1, wherein the masking restriction does not change cipher operation properties.

7. The system of claim 1, wherein the masking restriction comprises a dynamic masking restriction comprising a rule used to dynamically define ranges of values based on a value of the instance of the composite format.

8. The system of claim 1, wherein the composite format further comprises a format restriction that restricts a domain of the composite format.

9. A computer-implemented method, comprising:
generating, via a processor, a composite regular expression representing a composite textual pattern of a composite format, where the composite format is a hierarchical composition of sub-formats in a recursive manner, and each sub-format is a format that comprises a data unit that can match, search, and rank itself, and the sub-formats are represented as regular expressions;
searching received data, via the processor and the composite regular expression, for an instance of the composite format,
wherein the instance of the composite format is validated by performing nested validations in which the sub-formats of the composite format are validated before the composite format is validated, and
wherein a masking restriction is included with the received data, the masking restriction comprising a range of possible values for a mask and an immutable restriction to hold a sub-format of the composite format defined using a regular expression to an original value;
generating, via the processor, the mask for the instance of the composite format based on the masking restriction; and
outputting, via the processor, the generated mask.

10. The computer-implemented method of claim 9, wherein generating the mask comprises ranking the instance based on a tile specified in the masking restriction and masking the ranking to a second instance of the composite format within the tile.

11. The computer-implemented method of claim 9, wherein generating the mask comprises dynamically generating tiles based on the masking restriction and the instance, wherein the generated mask comprises a value within a dynamically generated tile that includes the instance.

12. The computer-implemented method of claim 9, wherein generating the mask comprises generating a new format based on the instance in response to detecting that the masking restriction comprises the immutable restriction, and generating the mask for the instance based on the new format.

13. The computer-implemented method of claim 9, wherein generating the mask comprises dynamically dividing an entire domain of the composite format into a plurality of sub-domains and dynamically restricting the mask of the instance to a value within a sub-domain of the plurality of sub-domains corresponding to the instance.

14. The computer-implemented method of claim 9, further comprising masking in place the matched instance with the generated mask to generate masked data.

15. The computer-implemented method of claim 14, further comprising outputting the masked data to an application to be used as test data for validation of the application.

16. A computer program product for masking instances of formats, the computer program product comprising a computer-readable storage medium having program code embodied therewith, the program code executable by a processor to cause the processor to:
generate a composite regular expression representing a composite textual pattern of a composite format, where the composite format is a hierarchical composition of sub-formats in a recursive manner, and each sub-format is a format that comprises a data unit that can match, search, and rank itself, and the sub-formats are represented as regular expressions;
search received data using the composite regular expression for an instance of the composite format,
wherein the instance of the composite format is validated by performing nested validations in which the sub-formats of the composite format are validated before the composite format is validated, and
wherein a masking restriction is included with the received data, the masking restriction comprising a range of possible values for a mask and an immutable restriction to hold a sub-format of the composite format defined using a regular expression to an original value;
generate the mask for the instance of the composite format based on the masking restriction; and
output the generated mask.

17. The computer program product of claim 16, further comprising program code executable by the processor to rank the instance based on a tile specified in the masking restriction and mask the ranking to a second instance of the composite format within the tile.

18. The computer program product of claim 16, further comprising program code executable by the processor to dynamically generate tiles based on the masking restriction and the instance, wherein the generated mask comprises a value within a dynamically generated tile that includes the instance.

19. The computer program product of claim 16, further comprising program code executable by the processor to generate a new format based on the instance in response to detecting that the masking restriction comprises the immutable restriction, and generate the mask for the instance based on the new format.

20. The computer program product of claim 16, further comprising program code executable by the processor to dynamically divide an entire domain of the composite format into a plurality of sub-domains and dynamically restrict the mask of the instance to a value within a sub-domain of the plurality of sub-domains corresponding to the instance.

* * * * *